July 20, 1926. 1,592,889
R. F. KNIGHT
MEANS FOR CONTROLLING FLUIDS
Filed Jan. 8, 1924 2 Sheets-Sheet 2
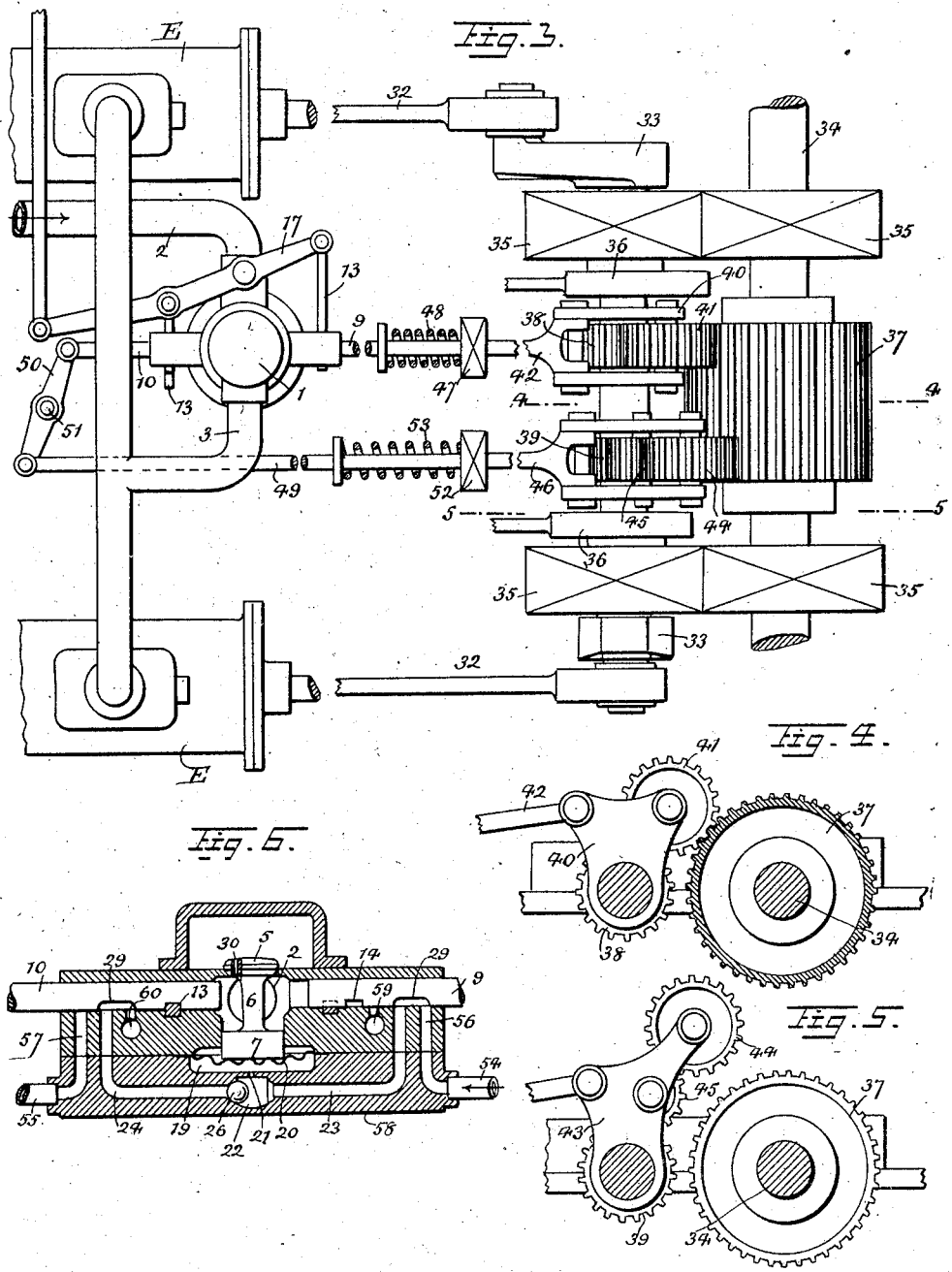
WITNESSES
INVENTOR
R. F. Knight
BY
ATTORNEYS Patented July 20, 1926.

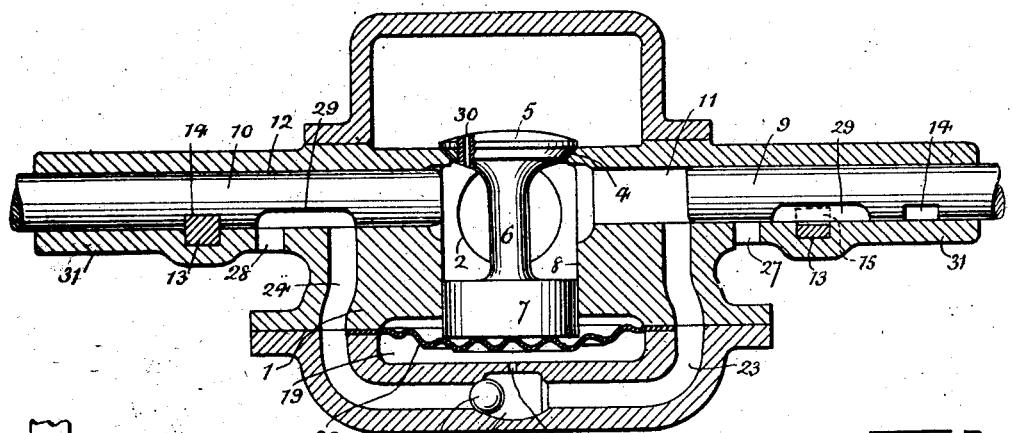
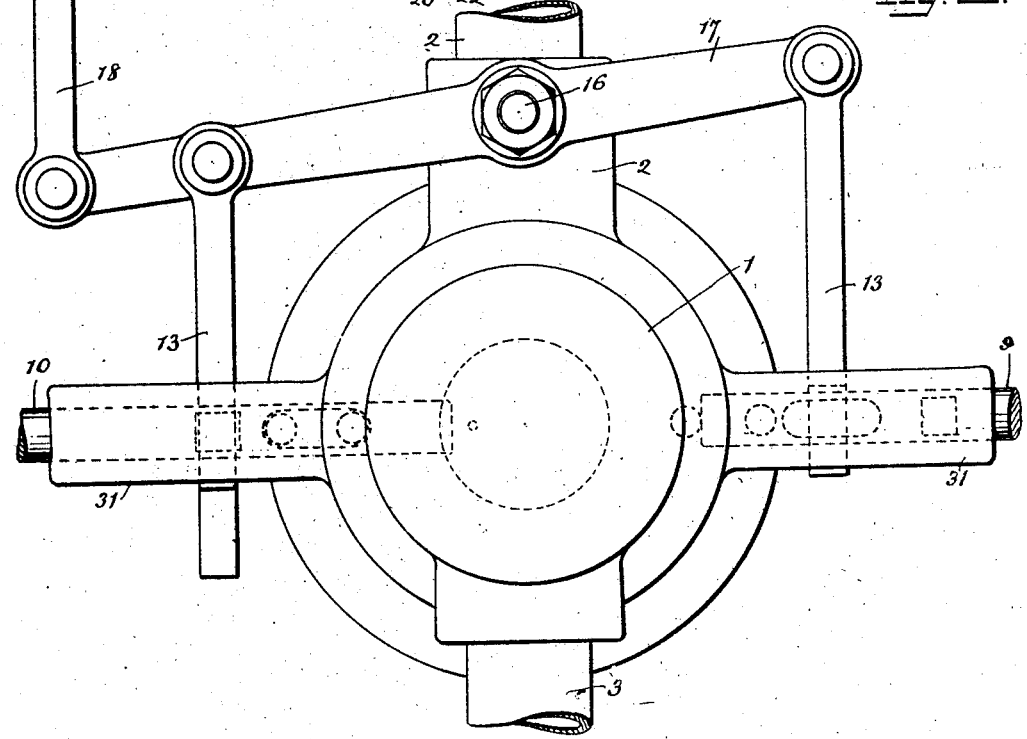

1,592,889

UNITED STATES PATENT OFFICE.

RONALD F. KNIGHT, OF RAMSEY, NEW JERSEY.

MEANS FOR CONTROLLING FLUIDS.

Application filed January 8, 1924. Serial No. 684,997.

This invention relates to means for controlling fluid, and while I shall hereinafter refer to "steam" as "fluid", employed or controlled, it is to be distinctly understood that I use this term merely for brevity and for clearness of description, with the understanding that the invention covers broadly the use or employment or control of any fluid which may possibly be used for the purposes intended.

An object of the invention is to provide an improved construction and arrangement of valves and a plunger or plungers controlling the direction of flow of the steam to crack and open the valve and cause the same to close as well as perform some other useful function, as for example the operation or control of transmission gears.

Other objects and purposes of my invention will be more fully hereinafter described and pointed out in the claims.

In the accompanying drawings—

Figure 1 is a view in longitudinal section illustrating a preferred form of my improved valve;

Figure 2 is a top plan view of the valve shown in Figure 1;

Figure 3 is a plan view, parts being broken away and illustrated more or less diagrammatically to indicate one use or application of my improved fluid controlling device;

Figure 4 is a view in section on the line 4—4 of Figure 3;

Figure 5 is a view in section on the line 5—5 of Figure 3;

Figure 6 is a view similar to Figure 1, illustrating a modification.

I shall first describe in detail the constructions illustrated and then point out the operation and the advantages which are accomplished by my improved device, it being of course understood that a wide modification is possible in the construction of the apparatus and that I do not limit myself to the specific details set forth.

Referring more particularly to Figures 1 and 2 of the drawings, 1 represents a valve casing, having a steam inlet 2, and a steam outlet 3, although the passage of steam may be exactly reversed, if desired.

Within the valve casing and between the inlet and outlet ports a valve seat 4 is provided against which a valve 5 is adapted to be seated. This valve 5 may be connected by a rigid stem or reduced portion 6 with a plunger 7. The plunger 7 fits a bore 8 in the interior of the casing and is of a larger diameter than the valve.

In connection with my improved valve I illustrate a pair of plungers 9 and 10, although for purposes of operation of the valve one of these plungers would suffice, but for many practical uses it is advisable to employ two. These plungers not only perform mechanical functions but they also serve as slide valves and are movable in bores 11 and 12, respectively, of plunger guides 31, which communicate with the bore 8 and which may be in alinement as shown or otherwise positioned, and which have their inner ends exposed to steam pressure within the casing, on the supply side of the valve 5.

These plungers 9 and 10 may be locked against movement in various ways. I have illustrated a simple construction in which a pair of locking bars 13 is employed, which move through recesses 14 in plungers 9 and 10, and have recesses 15 in said bars which when moved into register with the plungers will allow the plungers to move, but in other positions will hold the plungers securely locked. These bars 13 may be connected to opposite sides of the fulcrum 16 of the lever 17, and may be controlled by a link 18, either manually or automatically, as may be desired.

The valve casing 1 at the end of bore 8 is provided with a chamber 19 which is of appreciably greater diameter than the bore 8, ad in this chamber 19 a diaphragm 20 is located and secured at its edges so as to render the same steam-tight. This diaphragm rests directly against the plunger 7, and the chamber 19 below said diaphragm is connected by a small port 21 with a valve chamber 22.

This valve chamber 22 is connected by passages 23 and 24 with the bores 11 and 12, respectively, and a ball valve 26 is located in the chamber 22 and may seat at either end of the chamber so as to cut off either of the passages 23 and 24, as the case may be, but allow communication through the port 21 so as to exert pressure on the diaphragm, as will more fully hereinafter appear.

The bores 11, 12 comunicate with outlet ports 27 and 28, and the plungers 9 and 10 have recesses 29 therein which are of a length to connect either of the passages 23 or 24 with the respective outlets 27 or 28.

Figure 1 illustrates the valve 5 in closed position, although when the steam reaches the necessary pressure it will open the valve. Means for permitting a relatively small portion of the controlled fluid to pass from the inlet to the outlet side of valve 5 is represented, in my preferred form, by the opening or port 30, provided in the valve and which extends through the same, the purpose of which will more fully hereinafter appear.

A plurality of plungers may be employed, the selection of which plunger, or combination of plungers is or are to be locked, and which plunger or combination of plungers is or are to be unlocked by any particular movement of the locking means, will be determined by the requirements of the particular apparatus in conjunction with which this invention may be employed. As an instance, a steam hoist may be cited, having a two-speed gear, say both forward and back. To hoist a light load, the fast speed and the forward gears would require meshing, whilst the low speed and the backward gears must at that time be locked; and a heavy load would make necessary the use of the low and the forward gears, the high and the reverse trains being locked.

The operation of the valve as illustrated in Figure 1 is as follows: The drawing illustrates the valve just before it opens. In other words, steam has been admitted to the bore 8, which is the inlet side of the valve, and as the plunger 9 is free while the plunger 10 is locked, the plunger 9 is moved outwardly so as to allow the steam to flow through the passage and port 21 into the chamber 19, when pressure builds up in this chamber 19 against the diaphragm 20 the valve will be opened.

The steam which may have been locked in the chamber 19 and the passage 24 previous to this operation will have been exhausted through passage 28, as clearly shown at the left of Figure 1, and I wish to lay special emphasis on this fact, that I do not permit that portion of the stem which has been used to operate or open valve 5 to pass to the ordinary steam line or passage, but exhaust it elsewhere.

In Figure 3 I illustrate one application of my improved means for controlling the fluids to show the practical application thereof. In this view, we will assume that E, E represent steam engines, the connecting rods 32 of which are operatively connected to a drive shaft 33. 34 represents a driven shaft which may constitute the drive shaft of an automobile or any other mechanism, and 35 represents supports for the respective shafts. 36 illustrates fragments of eccentric rods for controlling the operation of the engines E, E, and 37 is a relatively long gear wheel on the driven shaft 34, The drive shaft 33 has two pinions 38 and 39. A rocking frame 40 is mounted on the shaft 33 and carries a pinion 41 in mesh with pinion 38 and adapted to be moved by a link 42 into mesh with the gear 37. A second rocking frame 43 is mounted on the shaft 33 and carries a pinion 44 at its free end. This pinion 44 is maintained in mesh with the pinion 39 by means of an idler 45, and the frame 43 is adapted to be moved by a link 46 to move the pinion 44 into mesh with the gear wheel 37.

It will thus be noted that when the pinion 41 is in mesh with the gear wheel 37 the driven shaft will be turned in one direction, and when the pinion 41 is out of mesh and pinion 44 is moved into mesh with the gear 37 the shaft 34 will be driven in the opposite direction.

The link 42 is operatively connected to the plunger 9 which extends through a support 47, and a coil spring 48 exerts pressure on the plunger 9 tending to move it inwardly or toward the center of the valve casing 1. The link 46 is operatively connected to a rod 49, the latter being connected to one end of a rocking lever 50, said lever pivoted between its ends as shown at 51, and at its opposite end connected to the plunger 10. The rod 49 is movable through a support 52, and a coil spring 53 on said rod exerts pressure to move the plunger 10 inwardly.

When my improved apparatus is used for controlling a gear transmission as well as for controlling the passage of steam to an engine or engines, a mechanism similar to that shown in Figure 2 may be employed.

In Figure 6 I illustrate a modification in which the valve 5 is caused to move by a fluid other than that controlled by the valve 5, or, in other words, from a source outside of the valve. In most respects the construction is similar to that illustrated in Figure 1 except that I provide fluid supply pipes 54 and 55 which communicate with passages 56 and 57, respectively, in a valve casing 58. These passages 56 and 57 are adapted to be connected by the recesses or passages 29 of the plungers 9 and 10, respectively, with the passages 23 and 24. I use reference numerals in Figure 6 corresponding to similar parts in Figure 1 for purposes of clearness. 59 and 60 represent exhaust ports which are connected by the recesses or passages 29 when exhausting from the chamber 19.

The operation of my apparatus as illustrated in the assembled form in Figure 3 and in detail in Figures 1, 2, 4 and 5 is as follows:

The steam enters through the passage 2 and exerts pressure on the plunger 9 which is unlocked, the plunger 10 being securely locked by bar 13, as shown. The plunger 9 is forced outwardly and serves to press the spring 47 and move the pinion 41 into mesh with the gear 37. If the gears do not properly mesh a certain portion of the steam which has escaped through the port 30 and valve 5 will be sufficient to cause an operation of the engine to transmit a slight motion to shaft 33 and turn pinions 38 and 41 until they move into proper mesh before the full power of the engine can be reached. As the plunger 9 has been forced outwardly the steam will pass downwardly through passage 23 and through port 21 exerting pressure on the diaphragm 20 to move the valve into open position, and the parts will remain in this position as long as desired.

When the steam valve (not shown) cuts off the supply of steam the plunger 9 will be moved inwardly by action of the spring so as to register its passage or recess 29 with the passage 23 and the port 27, and allow the steam in the passage 23 and chamber 19 to escape by way of port 27. It is obvious that when the plunger 9 is locked and the plunger 10 is forced outwardly the pinion 44 will be moved into mesh with the pinion 37 to reverse the drive, and the operation will be similar to that described.

By moving lever 17 to a position between the extremes, both plungers 9 and 10 may be locked, thus permitting the engines to slowly operate, by means of the steam supplied by the bypass for purposes of engine test or warming up prior to anticipated driving of shaft 34, thus by reducing condensation, high efficiency is reached earlier.

It will thus be noted that my improved valve is opened automatically and closed automatically. It will also be noted that when the pressure of steam on the plunger 7 and valve is properly proportioned the valve will first "crack" immediately but not open fully, and will not be fully opened until full pressure is reached.

I claim:

1. A fluid controlling device, including a casing having a cylindrical bore therein with a valve seat at one end of the bore, fluid inlet and outlet ports in the casing, one of said ports communicating with said bore, a valve adapted to engage the seat, a plunger fitting the bore, a fixed stem connecting the valve and the plunger, said casing having smaller bores communicating with the first mentioned bore, plungers fitting said smaller bores and constituting slide valves, a diaphragm chamber below the first mentioned bore, a diaphragm in said chamber engaging the plunger, a pair of passages connecting the smaller bores with a port communicating with the diaphragm chamber, a ball valve controlling the flow through said passages to said port, said plungers adapted to be unlocked so as to permit movement of the plungers one at a time, the locked plunger maintaining an exhaust communication from its passage and the movable plunger when moved permitting the passage of live fluid to open the valve.

2. A fluid controlling device, including a casing having a cylindrical bore therein with a valve seat at one end of the bore, steam inlet and outlet ports in the casing, one of said ports communicating with said bore, a valve adapted to engage the seat, a plunger fitting the bore, a fixed stem connecting the valve and the plunger, said casing having smaller bores communicating with the first mentioned bore, plungers fitting said smaller bores and constituting slide valves, a diaphragm chamber below the first mentioned bore, a diaphragm fitting said chamber engaging the plunger, a pair of passages connecting the smaller bores with a port communicating with the diaphragm chamber, a valve controlling the flow through said passages to said port, said plungers adapted to be unlocked one at a time, the locked plunger maintaining an exhaust communication from its passage to the atmosphere and the movable plunger when moved permitting the passage of live fluid from the first mentioned bore to the diaphragm chamber to open the valve, and springs exerting pressure to move the plunger inwardly, and said plungers adapted when moved outwardly to control the operation of mechanical means.

3. A fluid controlling device, including a casing having a cylindrical bore therein with a valve seat at one end of the bore, steam inlet and outlet ports in the casing, one of said ports communicating with said bore, a valve adapted to engage the seat, a plunger fitting the bore, a fixed stem connecting the valve and the plunger, said casing having smaller bores communicating with the first mentioned bore, plungers fitting said smaller bores and constituting slide valves, a diaphragm chamber below the first mentioned bore, a diaphragm in said chamber engaging the plunger, a pair of passages connecting the smaller bores with a port communicating with the diaphragm chamber, a valve controlling the flow through said passages to said port, said plungers adapted to be unlocked one at a time, the locked plunger maintaining an exhaust communication from its passage, and the movable plunger when moved permitting the passage of live fluid from the first mentioned bore to the diaphragm chamber to open the valve, said locking device including a lever pivoted between its ends, and bars at the ends of the levers adapted to move through registering recesses in the plunger and their guides whereby only one of said plungers can be unlocked at the time but both can be locked.

4. A fluid controlling device including a valve, a fluid controlled means for moving the valve having inlet and exhaust passages communicating therewith, a pair of plungers functioning as slide valves and controlling said passages, said plungers adapted to be unlocked one at a time, the locked plunger maintaining an exhaust communication from its passage to the atmosphere, and the movable plunger when moved permitting the passage of live fluid to the valve operating means, and said plungers adapted when moved in one direction to control the operation of mechanical means.

RONALD F. KNIGHT.